(12) United States Patent
Zheng

(10) Patent No.: US 8,379,857 B1
(45) Date of Patent: Feb. 19, 2013

(54) SECURE KEY DISTRIBUTION FOR PRIVATE COMMUNICATION IN AN UNSECURED COMMUNICATION CHANNEL

(75) Inventor: Lantian Zheng, San Jose, CA (US)

(73) Assignee: Google Inc., Mountain View, CA (US)

( * ) Notice: Subject to any disclaimer, the term of this patent is extended or adjusted under 35 U.S.C. 154(b) by 138 days.

(21) Appl. No.: 13/075,927

(22) Filed: Mar. 30, 2011

(51) Int. Cl.
*H04L 9/08* (2006.01)
(52) U.S. Cl. .......................... 380/255; 380/277; 380/286
(58) Field of Classification Search .................. 380/255
See application file for complete search history.

(56) References Cited

U.S. PATENT DOCUMENTS

| | | | |
|---|---|---|---|
| 7,660,904 B2 * | 2/2010 | Qureshi et al. | 709/229 |
| 2003/0012386 A1 * | 1/2003 | Kim et al. | 380/286 |
| 2010/0054481 A1 * | 3/2010 | Jajodia et al. | 380/284 |
| 2010/0257365 A1 * | 10/2010 | Anchan et al. | 713/171 |
| 2012/0072723 A1 * | 3/2012 | Orsini et al. | 713/165 |

* cited by examiner

*Primary Examiner* — Matthew Smithers
(74) *Attorney, Agent, or Firm* — Patent Law Works LLP

(57) ABSTRACT

A method to enable the secure distribution of encryption keys so as to facilitate private communication between users in an unsecured communication network is provided. Such a method may also provide a way to detect an unauthorized access of an encryption key so as to mitigate or prevent any loss of confidential information during communication.

22 Claims, 8 Drawing Sheets

SECURE KEY DISTRIBUTION FOR PRIVATE COMMUNICATION IN AN UNSECURED COMMUNICATION CHANNEL

BACKGROUND

1. Field

Embodiments relate generally to digital communications.

2. Background

Digital communications systems have become pervasive in recent years. Users increasing rely on email, instant messaging, Voice over Internet Protocol (VOIP), video conferencing and other similar types of network based communication channels for exchanging information, including private and confidential information. In general, information transmitted over, for example, the Internet can be intercepted or tapped at various points, such as ISP routers and WIFI access points. As a result, end-to-end encryption is important for protecting confidentiality of digital communication. To use encryption, the communicating parties need to share a secret encryption key first. This is a challenging task because the communicating parties generally do not have secure communication channels among them.

In theory, the public key infrastructure (PKI) provides a solution for this: the communicating parties can publish their public keys, and one party can create a new encryption key and send the key to other parties securely by encrypting the key with public keys of other parties. However, in practice, the usability of PKI is low for individual users because it is difficult for them to manage their private key properly. For example, a user may need to put his private key on every device he might want to use for secure communication, and that makes the key more likely to be leaked. In addition, the damage of a leaked private key is very severe, which means the confidentiality of all the previous private communications derived from the private key may be compromised.

BRIEF SUMMARY

The capability to securely distribute encryption keys so as to enable private communication between users in an unsecured communication network is provided. Such a capability may also provide a way for communicating parties to detect an unauthorized access of an encryption key so as to mitigate or preclude any loss of confidential information during communication.

Embodiments relate to sending private messages in an unsecured communication network. In an embodiment, a share request for a private message associated with one or more recipients is transmitted to a trusted third-party. The share request includes an encryption key and a share value. The share value is based on the number of recipients of an encrypted private message. In addition, the encryption key is distributed by the trusted third party according to the share value. A key identifier is received from the trusted third party based on the transmitted share request. The trusted third party generates a new key identifier for each share request it may receive. The key identifier from the trusted third party is then sent to the recipients of the private message. The key identifier is used by the recipients to request the encryption key from the trusted third party while the encryption key is used by the recipients to decrypt the encrypted private message. Next, it is verified that a receipt notification is received from each recipient. The receipt notification is sent by each recipient only in response to successfully obtaining the encryption key from the trusted third party. If the receipt notification is not received from each intended recipient of the private message, the encryption key is discarded and the steps discussed above are repeated for a new encryption key. However, if the receipt notification is received from each intended recipient, the encrypted private message is sent to these intended recipients.

Embodiments may be implemented using hardware, firmware, software, or a combination thereof and may be implemented in one or more computer systems or other processing systems.

Further embodiments, features, and advantages of the present invention, as well as the structure and operation of the various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number.

Figure 1:
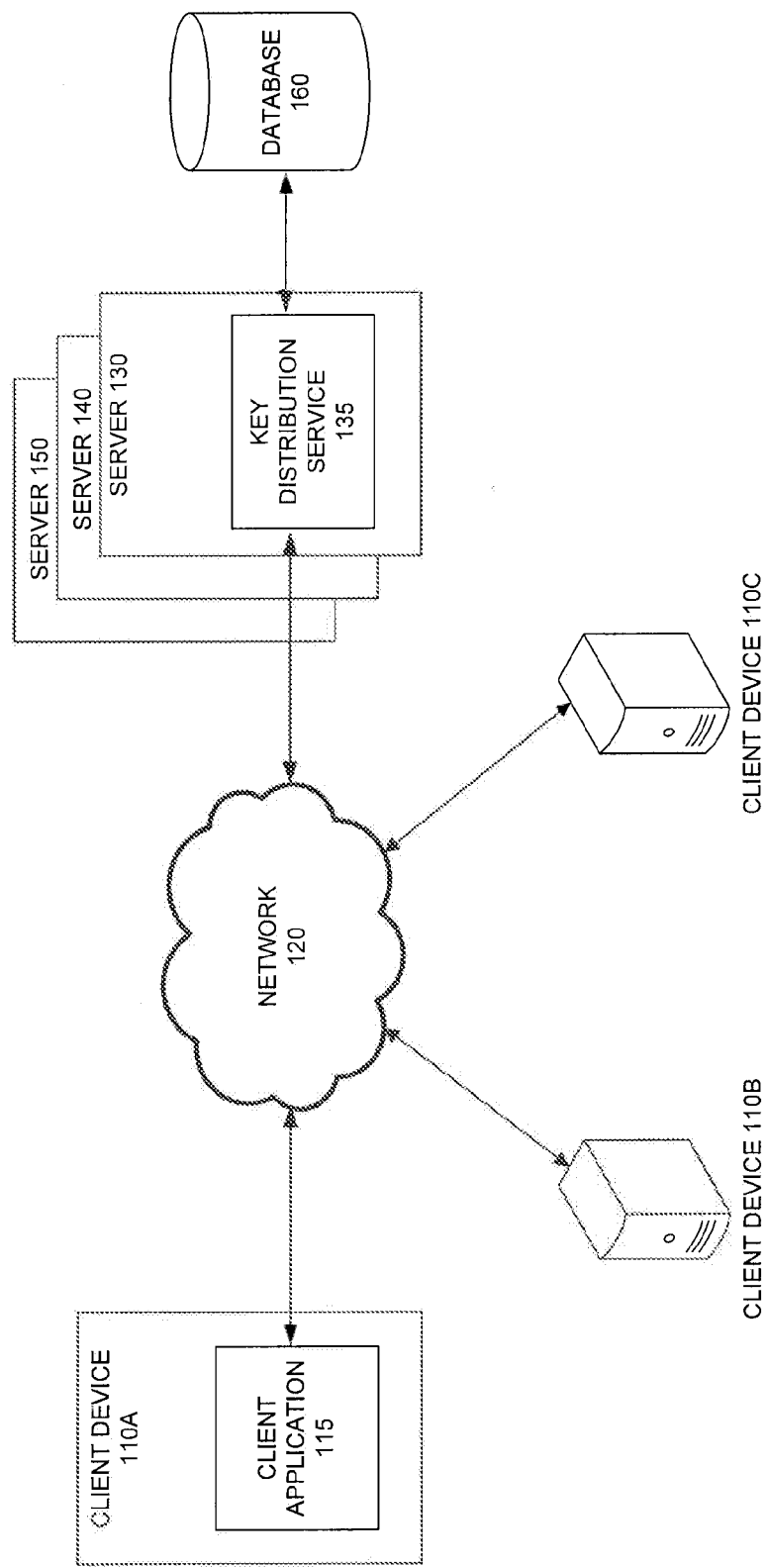
FIG. 1 is a diagram of an exemplary communication system suitable for practicing an embodiment.

The accompanying drawings, which are incorporated herein and form part of the specification, illustrate the embodiments of present invention and, together with the description, further serve to explain the principles of the invention and to enable a person skilled in the relevant art(s) to make and use the invention.

DETAILED DESCRIPTION

I. Introduction

Embodiments relate to enabling private communication between users in an unsecured communication network. A secure way of distributing encryption keys is needed to implement secure communication channels. However, secure communication channels are generally needed to ensure the key distribution process remains secure. Such a causality problem may be resolved with the assumption that it may actually be acceptable that an encryption key is compromised during the distribution process so long as the compromise or security leak can be detected. For example, if a leak is detected in a relatively short period of time, communicating parties may be able to take necessary precautions to mitigate any further loss of confidential information. Further, if a leaked encryption key is detected, the communicating parties can simply recreate a new key and try to distribute the new key. As will be described in further detail below, embodiments leverage the above-noted assumption to enable private communication between users even in an unsecured communication network.

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The term "trusted third party" is used herein to refer broadly and inclusively to any entity that facilitates communications between two or more users over a network, who both trust the entity with the users' confidential information. Such a trusted third party may use any number of well known methods to secure user interactions and network communications to and from each user. Further, such a trusted third party may provide a trusted third party service or applications interface that can be accessed by a client application executed at a client device corresponding to each user. Additional characteristics and operational aspects of trusted third parties would be apparent to a person skilled in the relevant art given this description.

II. System Overview

FIG. 1 is a diagram of a communication system 100 suitable for practicing an embodiment. In the example shown in FIG. 1, system 100 includes a client 110A, a client 110B, a client 110C, a network 120, a server 130, a server 140, a server 150, and a database 160. Client 110A includes a client application 115. Server 130 includes a key distribution service 135. Although clients 110A-110C are shown in FIG. 1, it is noted that the number of clients that may be used can be two or more.

Similarly, although servers 130, 140, and 150 are shown in FIG. 1, more or fewer servers may be used as necessary. For example, key distribution service 135 may be implemented in a single server (e.g., server 130) or across a plurality of servers (e.g., servers 130, 140, and 150). In this regard, servers 130, 140, and 150 may be implemented as a clustered computing environment utilizing one or more computing devices.

In an embodiment, server(s) 130 are operated by a trusted third party and key distribution service 135 is a trusted third party service, as described above. In an embodiment, clients 110A-110C communicate with server(s) 130 and with each other over network 120. Clients 110A-110C can be any type of computing device with at least one processor, local memory, display, and one or more input devices (e.g., a mouse, QWERTY keyboard, touch-screen, microphone, or a T9 keyboard). Such a computing device can include, but is not limited to, a mobile phone, a personal digital assistant (PDA), a computer, a cluster of computers, a set-top box, or other similar type of device capable of processing instructions. Similarly, server(s) 130 can be implemented using any type of computing device capable of serving data to clients 110A-110C.

In an embodiment, server(s) 130 are communicatively coupled to database 160. Database 160 may be any type of data storage known to those of skill in the art. In an example, the data storage may be a database management system, such as a relational database or any other type of database known to those skilled in the relevant art given this description. Database 160 may store any type of data accessible by server(s) 130. Although only database 160 is shown, more databases may be used as necessary.

Network 120 can be any network or combination of networks that can carry data communication. Such a network can include, but is not limited to, a wired (e.g., Ethernet) or a wireless (e.g., Wi-Fi and 3G) network. In addition, network 120 can include, but is not limited to, a local area network, medium area network, and/or wide area network such as the Internet. Network 120 can support protocols and technology including, but not limited to, Internet or World Wide Web protocols and/or services. Intermediate network routers, gateways, or servers may be provided between components of communication system 100 depending upon a particular application or environment.

In an embodiment, client 110A executes a client application 115. In an embodiment, client application 115 may be implemented in client 110A as a standalone application or integrated within another application executable at client 110A such as, for example and without limitation, a web browser. For example, client application 115 may be implemented as a web service within a web browser implemented in client device 110A. Such a web service may be any one of various web services and applications executed by a web server (e.g., server(s) 130). Web services and applications may also include computer software applications that are hosted in the web browser. For example, such services and applications may be implemented as a Java applet or using a browser-supported language including, but not limited to, JavaScript, VBScript, Hyper Text Markup Language (HTML), or any other type of language for writing web services and/or applications.

In an embodiment, key distribution service 135 can provide one or more service application programming interfaces (APIs), which can be used by client application 115 to send and receive messages to and from key distribution service 135 over network 120. Although not shown in FIG. 1, client 110B and client 110C may also include client applications of their own to enable communication with, for example and without limitation, client application 115 and key distribution service 135 over network 120. The client applications of client 110B and client 110C may also utilize a programming interface of key distribution service 135 for purposes of communication over network 120, according to an embodiment. Client application 115 and key distribution service 135 are described in further detail below with respect to FIG. 2 and FIG. 3, respectively.

III. Sending Private Messages in an Unsecured Communication Channel

A. Client Application

Figure 2:
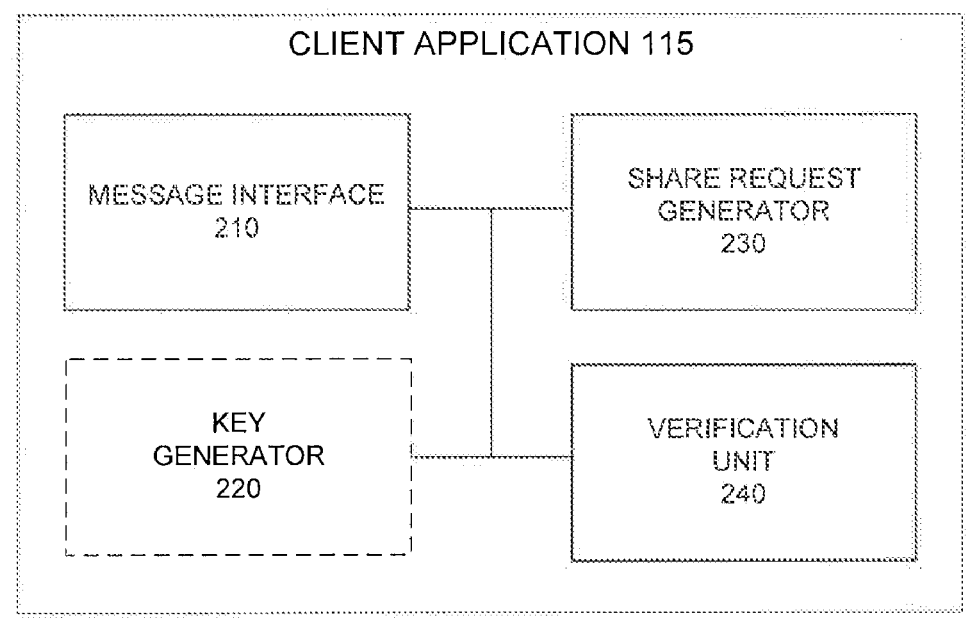
FIG. 2 is a diagram of an exemplary client application for sending private messages in an unsecured communication network, according to an embodiment.

FIG. 2 is a diagram of an exemplary client application 115 of FIG. 1 for sending private messages in an unsecured communication network, according to an embodiment. Client application 115 includes a message interface 210, a share request generator 230, and a verification unit 240. In an embodiment, client application 115 also includes a key generator 220 in addition to message interface 210, share request generator 230, and verification unit 240.

In an embodiment, message interface 210 enables a user to select an option to electronically send a private message to one or more recipients. For ease of explanation, the one or more recipients may be described with respect to client 110B and client 110C shown in FIG. 1. However, it is noted that embodiments are not limited to clients 110B and 110C. Further, client 110A may send private messages to additional client devices or alternatively, to only one of either client 110B or client 110C if, for example, only one recipient is selected to receive the private message.

In an example, message interface 210 may be integrated with an email client application. Such an email client application may be, for example, a standalone email client or implemented as a web service within a web browser, as described above. Further, a control selector (e.g., a button, a link, etc.) may be displayed within message interface 210 that can be selected by the user in order to designate a particular email message be sent as an encrypted private message. A person skilled in the relevant art would appreciate that email is provided for illustrative purposes and embodiments are not limited thereto. Further, embodiments are not limited to text-based communications and can therefore be implemented to send and receive encrypted audio and video communications. Accordingly, embodiments can be implemented in any type of application suitable for sending and/or receiving electronic communications. Such applications include, but are not limited to, client applications or services related to instant messaging, text messaging, and audio and/or video teleconferencing.

In the example above, the user may select the control selector and initiate the transmission of the private message from the user to the one or more recipients (e.g., to clients 110B and 110C) via a user input device coupled to client device 110A. Message interface 210 can be configured to receive the user input and the corresponding selected option to electronically send the private message. It is noted that once the user input is received, the operations of message interface 210, key generator 220, share request generator 230, and verification unit 240 can occur automatically, without any further user intervention, in accordance with embodiments. In response to receiving the selected option at message interface 210, share request generator 230 generates a share value for the private message, according to an embodiment. The share value generated by share request generator 230 is based on the number of recipients to which the user wishes to send the private message.

In an embodiment, share request generator 230 uses key generator 220 to generate an encryption key. A person skilled in the relevant art given this description would appreciate that the encryption key for the private message may be generated using any of a number of well-known methods for generating encryption keys. In an embodiment, share request generator 230 encrypts the private message using the generated encryption key. It would be apparent to a person skilled in the relevant art given this description that the encryption key may instead be generated in a separate application from client application 115 either at the same or different location from client device 110A.

For example, share request generator 230 may send a request via network 120 to key distribution service 135, described in further detail below, to generate an encryption key based on receiving the option to send a private message from the user. Key distribution service 135 may then generate and send the encryption key back to share request generator 230 in response. In a different example, share request generator 230 may send the message in addition to a request to encrypt the user's message to key distribution service 135. In this example, key distribution service 135 may then generate the encryption key, encrypt the message using the generated key, and send the encrypted message back to share request generator 230 in response.

In an embodiment, one or more recipients of the encrypted private message may be determined from information within the message itself. For example, the user may specify the recipients in a recipient field of the message (e.g., a "To" field in an email message). In an embodiment, share request generator 230 may determine the identity and number of recipients by extracting the information from the message. A person skilled in the relevant art given this description would appreciate that any number of well-known methods may be used to extract such recipient information from the message.

In an embodiment, share request generator 230 generates a share value based on the number of recipients specified by the user to receive the private message. In an embodiment, share request generator 230 transmits a share request, which includes the generated share value and the encryption key, to key distribution service 135 over network 120. As will be described in further detail below, the share value will be used by key distribution service 135 to determine the number of times the encryption key may be distributed. As noted above and as will be described further below, key distribution service 135 may be a trusted third party service configured to securely distribute encryption keys so as to facilitate private communications between clients 110A-110C, according to an embodiment. Further, a secure communication channel or protocol such as, for example, Hypertext Transfer Protocol Secure (HTTPS) is used by client application 115 and key distribution service 135 to communicate over network 120. Such a secure communication channel can also be used between the recipients (e.g., clients 110B and 110C) of the private message and key distribution service 135.

In an embodiment, share request generator 230 receives a key identifier from key distribution service 135 based on the transmitted share request. As will be described further below, the key identifier received from key distribution service 135 is a unique identifier corresponding to the specific share request transmitted by share request generator 230. In an embodiment, verification unit 240 sends the key identifier received from key distribution service 135 to the one or more recipients (e.g., clients 110B and 110C). In order to decrypt the encrypted private message, the recipients of the message will need the encryption key. To obtain the encryption key, the recipients make a request to the key distribution service 135 with the corresponding key identifier. For example, if the recipients client 110B and client 110C are each able to successfully obtain the encryption key from key distribution service 135, client 110B and client 110C can each send a receipt notification to client 110A over network 120.

In an embodiment, verification unit 240 verifies that a receipt notification is received from each intended recipient of the private message before sending the encrypted version of the private message to these recipients. By sending or broadcasting the receipt notification, the communicating parties (e.g., the message sender, client 110A, and the one or more recipients of the private message, clients 110B and 110C) are able to reach a consensus that an unauthorized access of the encryption key has not occurred. Moreover, sending the private message only after the receipt notifications have been received from the recipients helps to further minimize any risk of loss to any confidential information that may be within the private message. If verification unit 240 does not receive a receipt notification from each of the intended recipients, the encryption key can be discarded. In an embodiment, verification unit 240 waits a predetermined duration of time to receive the receipt notification after the key identifier is sent to the recipients.

For example, if the receipt notification has not been received before the predetermined period of time has elapsed, the encryption key and the encrypted version of the private message can be discarded. Verification unit 240 can then send its own notification to share request generator 230 in order to have a new encryption key generated and the message from the user encrypted again using the newly generated key. Further, the new key along with the same share value can be sent to key distribution service 135 in order to repeat the process for securely distributing the key to the recipients.

B. Key Distribution Service

Figure 3:
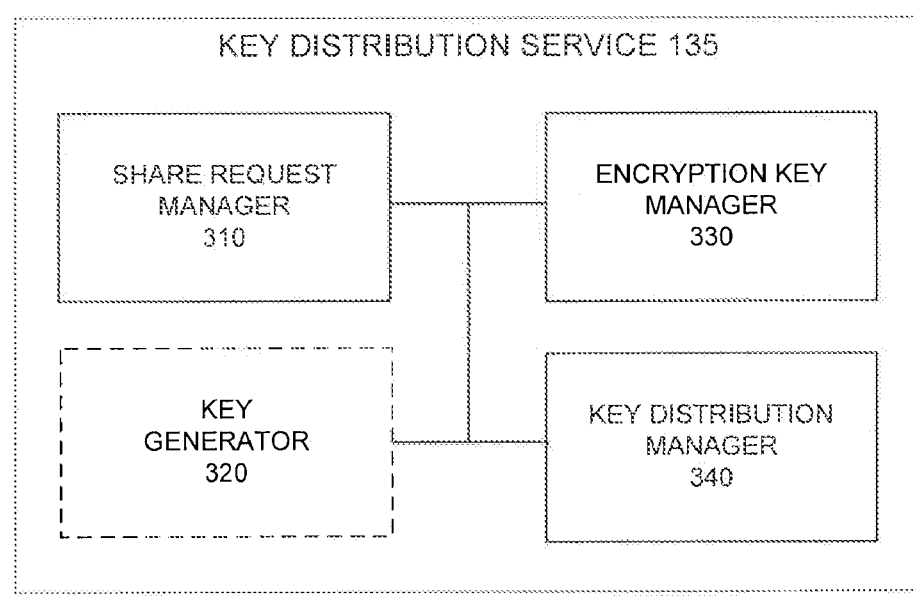
FIG. 3 is a diagram of an exemplary encryption key distribution service for enabling private communication in an unsecured communication network, according to an embodiment.

FIG. 3 is a diagram of an exemplary encryption key distribution service 135 of FIG. 1 for enabling private communication in an unsecured communication network, according to an embodiment. Key distribution service 135 includes a share request manager 310, an encryption key manager 330, and a key distribution manager 340. In an embodiment, key distribution service 135 may also include a key generator 320.

In an embodiment, share request manager 310 is configured to receive a share request from client 110A. As described above, the share request from client 110A includes a share value based on the number of recipients to which the user at client 110A wishes to send a private message. The share value is also used by key distribution manager 340 to determine the number of times the encryption key may be distributed. As noted above, the share request may also include an encryption key, generated at client 110A (e.g., by key generator 220), as described above. In an embodiment, share request manager 310 initially receives a request to generate an encryption key for the private message as well. For example, share request manager 310 may use key generator 320 to generate an encryption key and then send the generated encryption key back to client 110A over network 120 in response to the request.

In a further embodiment, share request manager 310 may receive the message to be encrypted along with the share request. In this embodiment, share request manager 310 can use key generator 320 to generate the encryption key, encrypt the received message using the key generated by key generator 320 and send the encrypted message back to client 110A.

As noted above, client 110A may then send the encrypted message it receives from share request manager 310 to the intended recipients (e.g., clients 110B and 110C) over network 120 only after client 110A (e.g., verification unit 240 of FIG. 2, as described above) has verified that the encryption key has been distributed to all intended recipients of the private message.

In an embodiment, encryption key manager 330 generates a unique key identifier for the encryption key. For example, encryption key manager 330 may use a random number generator to generate the key identifier. It is noted that in an embodiment, a new key identifier is generated for each share request received from client 110A. Encryption key manager 330 can then create an association including the encryption key, the key identifier, and the share value received from client 110A. The association of the encryption key, key identifier, and share value can then be stored by encryption key manager 330 in memory. For example, encryption key manager 330 may store the association in database 160 of system 100, shown in FIG. 1 and described above. In an embodiment, encryption key manager 330 transmits the generated key identifier to client 110A over network 120.

In an embodiment, key distribution manager 340 receives a key access request over network 120 from a requestor. The key access request from the requestor generally includes a key identifier related to an encryption key stored in memory (and associated with a share value). For example, the intended recipients of the private message (e.g., clients 110B and client 110C) may send such a key access request to key distribution service 135 over network 120. Key distribution manager 340 can retrieve the encryption key associated with the key identifier from memory or storage (e.g., database 160 of system 100, shown in FIG. 1 and described above). If the corresponding key exists in memory, it is retrieved and distributed by key distribution manger 340 to the requestor over network 120. Assuming the requestor who sent the key access request is an intended recipient of the encrypted private message, the encryption key can be used by the requestor to decrypt the encrypted private message, which may be sent by client 110A.

In an embodiment, if the corresponding key does not exist in memory, key distribution manager 340 may send an error message to the key access requestor. A message relating to a potential unauthorized access of the encryption key can also be sent to the sender of the private message who is also the encryption key share requestor (e.g., client 110A). If the requestor is an intended recipient (e.g., client 110B or client 110C), the error message would be an indication to the recipient that an unauthorized access of the encryption key has occurred. In this case, the recipient can send a message confirming that an unauthorized access of the encryption key has taken place to the original sender/share requestor.

In a case where the key access requestor may be an unintended or unauthorized recipient, it would be unlikely that such an unintended recipient would also have access to the encrypted private message, as the private message is sent separately to the intended recipients, and only after the intended recipients have each sent a receipt notification, as described above.

To minimize the probability of unauthorized access of the encryption key, encryption key manager 330 may delete the stored encryption key, share value, and key identifier from memory after a predetermined duration of time. The length of the duration of time may be predetermined by, for example, the user/sender who is sending the private message or by the particular trusted third party providing key distribution service 135. It should be noted that the information stored by key distribution service 135 may be for any arbitrary user. This makes key distribution service 135 potentially vulnerable to distributed denial-of-service (DDoS) attacks. For example, an attacker may flood key distribution service 135 with a large number of fake "share" requests, which may result in key distribution service 135 having to devote computing resources to the storage of unnecessary garbage information. To mitigate such an attack, key distribution service 135 can choose to delete the information stored after a certain duration (e.g., one hour) has elapsed regardless of whether the information is accessed or not.

In an embodiment, key distribution manager 340 uses the share value to control the number of times the encryption key is accessed. For example, if the share value is only two (e.g., corresponding to two recipients, client 110B and client 110C), encryption key manager 340 will delete the information corresponding to the share request, including the encryption key and key identifier, from memory once the encryption key has been accessed or distributed by key distribution manager 340 to each of two requestors. For example, encryption key manager 330 may decrement the share value after each time the encryption key is distributed to a requestor by key distribution manager 340. Further, encryption key manager 330 may check the share value for each share access request in order to determine whether the current value of the share value is equivalent to zero. A zero share value signifies that the encryption key has been distributed as many times as was specified in the initial share request from the message sender, e.g., client 110A. Therefore, encryption key manager 340 can delete the encryption key and key identifier corresponding to a zero share value.

A person skilled in the relevant art given this description would appreciate that any of well-known methods may be used to track the number of times the encryption key has been distributed by key distribution manager 340. For example, encryption key manager 330 may use a separate counter value also associated with the share request (including the encryption key, key identifier, and share value). In an embodiment, the counter value may be initialized to zero upon receiving the share request and incremented by one each time the encryption key is distributed in response to a key access request.

In an embodiment, encryption key manager 330 can be configured to compare the stored share value with the associated counter value and further configured to send an appropriate response based on the comparison. Key distribution manager 340 may distribute the encryption key to the requestor only when the counter value is less than the share value. In a further embodiment, encryption key manager may delete the stored association of the share value, encryption key, key identifier, and counter value when the counter value is equivalent to the share value.

IV. Method

Figure 4:
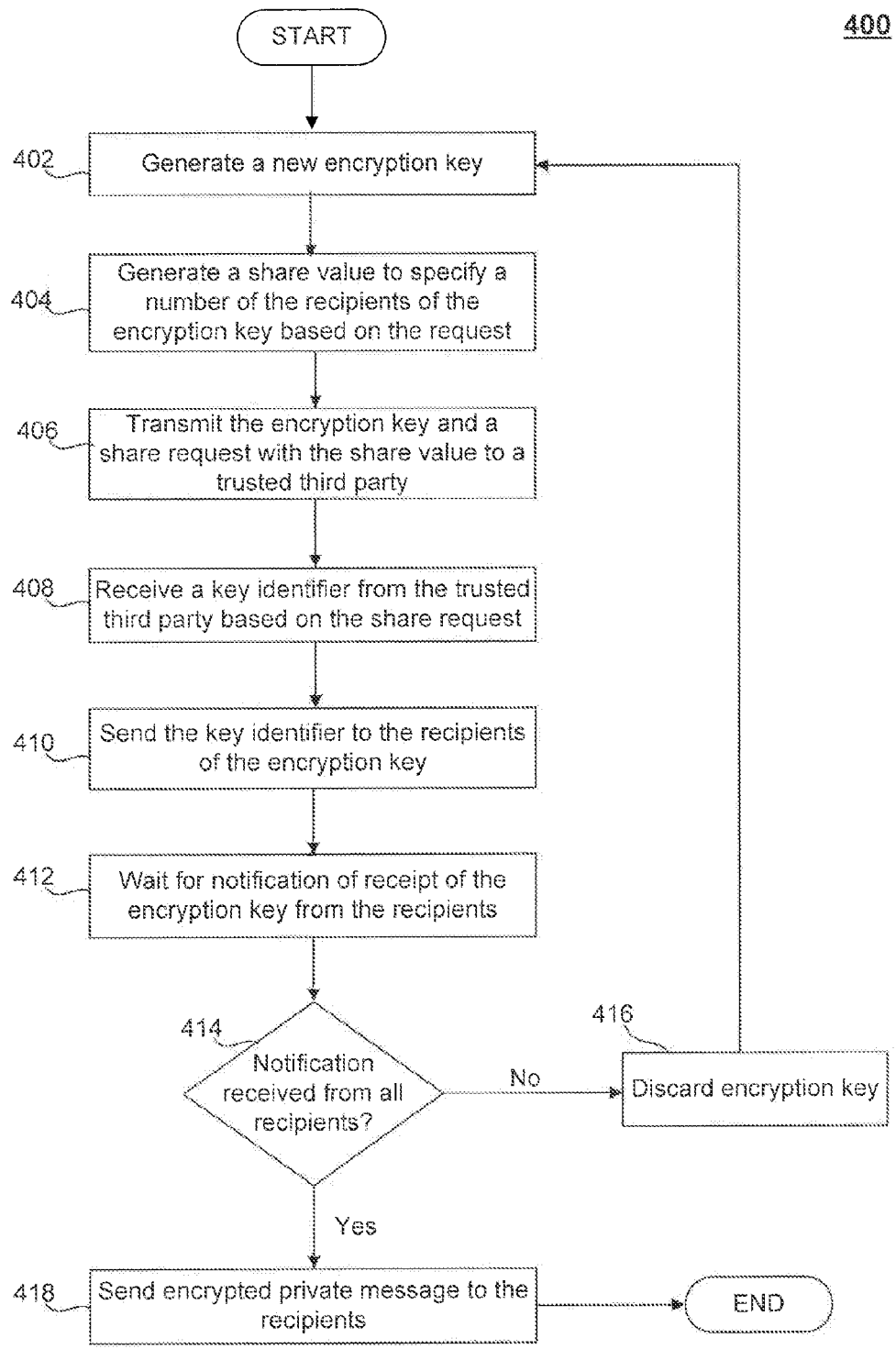
FIG. 4 is a flowchart of an exemplary method for sending private messages in an unsecured communication network, according to an embodiment.

FIG. 4 is a flowchart of an exemplary method 400 for sending private messages in an unsecured communication network, according to an embodiment. For ease of explanation, method 400 is described with respect to system 100 of FIG. 1 and client application 115 of FIGS. 1 and 2, but embodiments of the method are not limited thereto.

Method 400 begins in step 402, in which a new encryption key is generated. The encryption key may be generated in response to a request from a user to send a private message or communication to one or more recipients, as described above. Step 402 may be performed by, for example, key generator 220 of FIG. 2, as described above. The generated encryption key may be used to encrypt the private message. Method 400 then proceeds to step 404, which includes generating a share value corresponding to the number of recipients of the private communication/message.

In step 406, a share request including the generated encryption key (step 402) and the generated share value (step 404) is transmitted to a trusted third party. As described above, the share value may be used by the trusted third party to control the number of times the encryption key is distributed to various requestors, who should be the recipients of the private message who need to decrypt the encrypted private message. In step 408, a key identifier is received from the trusted third party based on the share request transmitted in step 406. Steps 404, 406, and 408 may be performed by, for example, share request generator 230 of FIG. 2, as described above.

In step 410, the key identifier that was received from the trusted third party (step 408) is sent to the intended recipients of the private message (and the encryption key). Method 400 then proceeds to step 412, which includes waiting for notification of receipt of the encryption key from the intended recipients of the message and encryption key. In step 414, it is determined whether such notification has been received from all of the intended recipients. For example, the waiting in step 412 may occur only for a predetermined duration of time. If the notification has been received, method 400 can proceed to step 418, in which the encrypted private message is sent to the intended recipients. Method 400 concludes after step 418. Otherwise, if the notification has not been received, method 400 proceeds to step 416 in which the encryption key is discarded and method 400 proceeds back to step 402, in which a new encryption key is generated. The steps of method 400 can therefore be repeated if the notification has not been received from each of the intended recipients of the private message (e.g., within a predetermined period of time). These steps may also be repeated if an error message or unauthorized access notification is received from any of the recipients instead of the receipt notification. Steps 410, 412, 414, 416, and 418 may be performed by, for example, verification unit 240 of FIG. 2, as described above.

An advantage of method 400 is that it provides a way for the sender and recipients to verify whether an unauthorized access has occurred and/or whether the encryption key has been leaked. The parties to the transaction can then take the necessary precautionary measures to ensure that any further unauthorized accesses and/or loss of confidential information does not occur.

Figure 5:
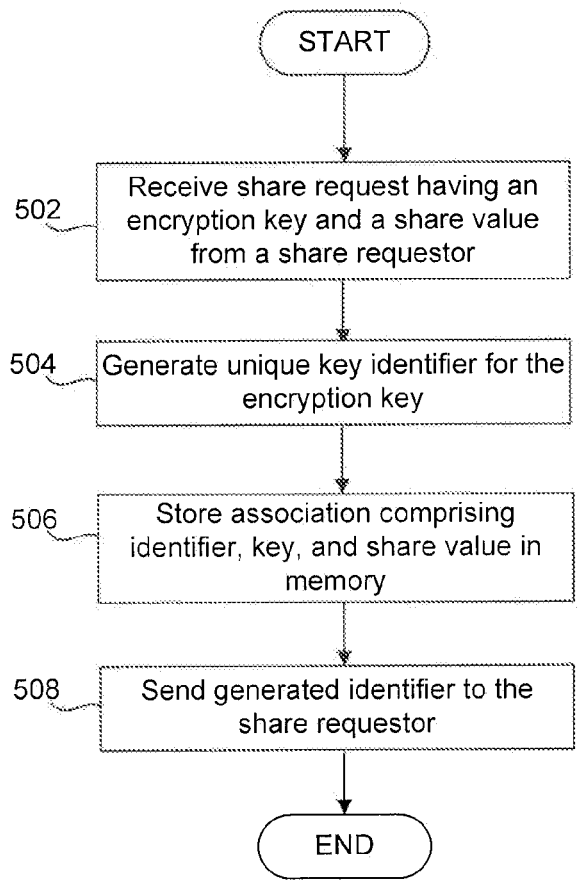
FIG. 5 is a flowchart of an exemplary method for managing encryption key share requests, according to an embodiment.

FIG. 5 is a flowchart of an exemplary method 500 for managing encryption key share requests, according to an embodiment. For ease of explanation, method 500 will be described with respect to system 100 of FIG. 1 and key distribution service 135 of FIGS. 1 and 3, as described above. However, it is noted that embodiments of the method are not intended to be limited thereto.

In an example, the steps of method 500 may be performed by a trusted third party service (e.g., key distribution service 135 of FIGS. 1 and 3, as described above). Method 500 begins in step 502, in which a share request is received from a share requestor. The share requestor is the party that wishes to send the private message (e.g., client 110A of FIG. 1, as described above). The share request may include an encryption key and a share value. The share value specifies the number of times the encryption key may be distributed. Step 502 may be performed by, for example, share request manager 310 of FIG. 3, as described above. Method 500 then proceeds to step 504, which includes generating a unique key identifier for the encryption key. In step 506, the generated key identifier is associated with the encryption key and the share value corresponding to the received share request. The association including the encryption key, the share value, and key identifier are stored in memory. Steps 504 and 506 may be performed by, for example, encryption key manager 330 of FIG. 3, as described above.

Method 500 then proceeds to step 508 in which the generated key identifier is sent to the share requestor (the sender of the private message). Step 508 may be performed by, for example, share request manager 310 of FIG. 3, as described above. Once the steps of method 500 have been performed by the trusted third party service (e.g., key distribution service 135 of FIGS. 1 and 3, as described above), the trusted third party service may then proceed to method 600 of FIG. 6, as described below.

Figure 6:
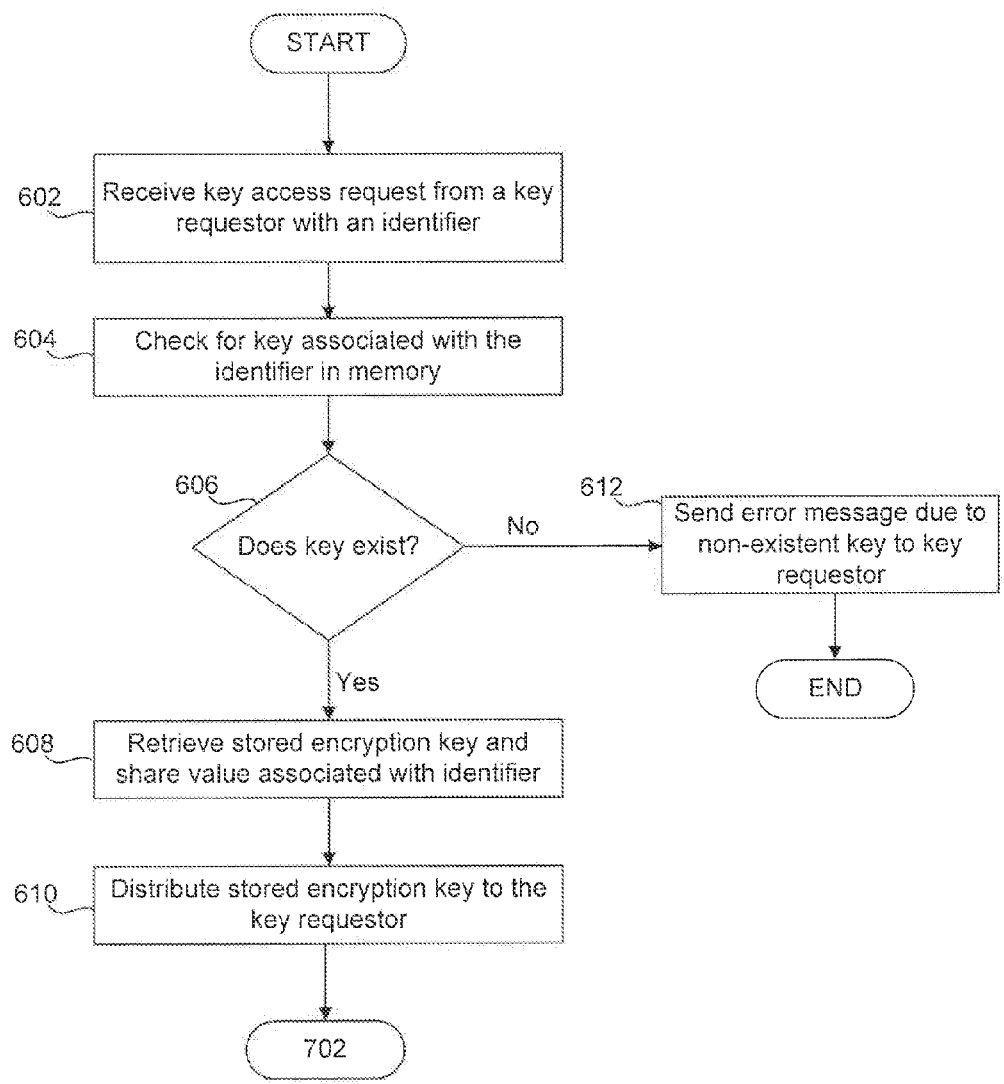
FIG. 6 is a flowchart of an exemplary method for managing key distribution in response to access requests, according to an embodiment.

FIG. 6 is a flowchart of an exemplary method 600 for managing encryption key distribution in response to access requests, according to an embodiment. For ease of explanation, method 600 will be described with respect to system 100 of FIG. 1 and key distribution service 135 of FIGS. 1 and 3, as described above. However, it is noted that embodiments of the method are not intended to be limited thereto.

Method 600 begins in step 602, which includes receiving a key access request from a key requestor. The key access request may include a key identifier (e.g., the key identifier generated in step 504 of method 500, as described above). The key requestor may be a recipient of the private message who, in response to receiving the key identifier from the sender of the private message, sends the key access request to the trusted third party key distribution service (e.g., key distribution service 135 of FIGS. 1 and 2, described above). Step 602 may be performed by, for example, share request manager 310 of FIG. 3, as described above. Method 600 then proceeds to step 604, which includes checking for the encryption key associated with the key identifier in memory (e.g., in database 160 of system 100, shown in FIG. 1 and described above).

In step 606, if it is determined that the key exists in memory, method 600 proceeds to step 608. However, if it is determined in step 606 that the key does not exist in memory, method 600 proceeds to step 612, in which an error message for the non-existent key is sent to the key requestor (from step 602). For example, the encryption key may not be in memory because it was deleted from memory after being distributed a number of times equivalent to the share value (as in step 708 of method 700, discussed below).

If the encryption key is present in memory, the stored encryption key and the share value associated with the key identifier are retrieved from memory in step 608. Step 608 may be performed by, for example, encryption key manager 330 of FIG. 3, as described above. In step 610, the retrieved encryption key is sent to the key requestor. Step 604, 606, 610, and 612 may be performed by, for example, key distribution manager 340 of FIG. 3, as described above. After step 610 is performed, method 600 proceeds to step 702 of method 700 of FIG. 7, discussed below.

Figure 7:
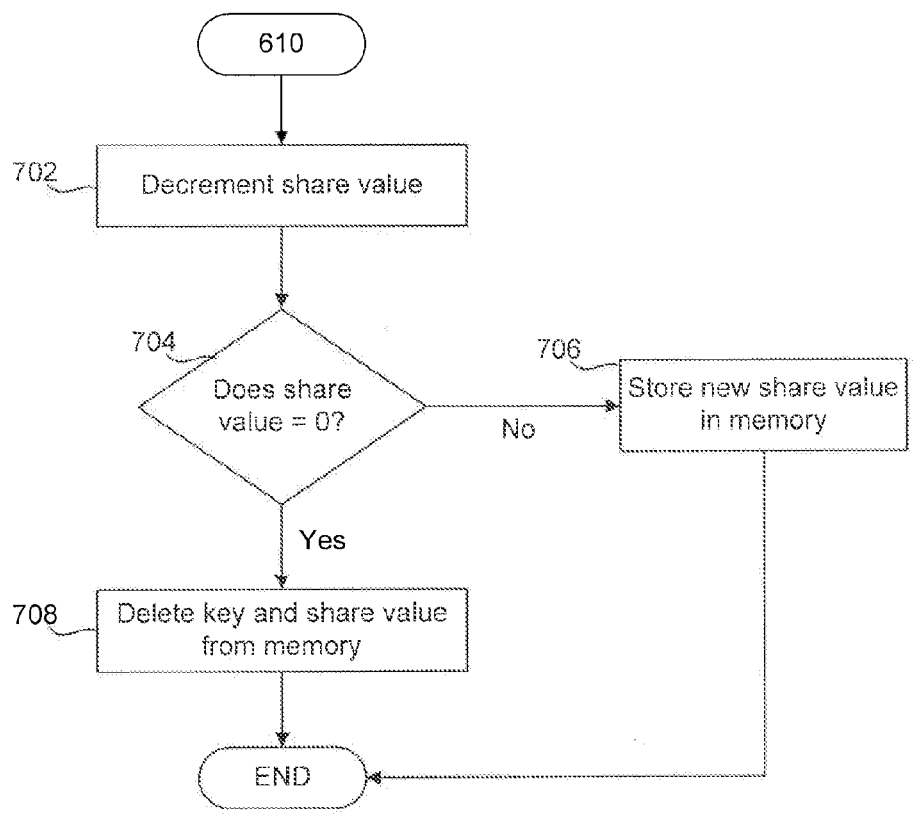
FIG. 7 is a flowchart of another exemplary method for managing key distribution in response to access requests, according to an embodiment.

FIG. 7 is a flowchart of a method 700 for managing key distribution in response to access requests, according to an embodiment. Method 700 can also be performed by the trusted third party service (e.g., key distribution service 135 of FIG. 3, as described above). It is noted that method 700 is described with respect to system 100 of FIG. 1 and key distribution service 135 of FIGS. 1 and 3, as described above, for ease of explanation, but embodiments of method 700 are not limited thereto.

Method 700 begins after step 610 of method 600, discussed above, in step 702, which includes decrementing the retrieved share value (step 608). In step 704, it is determined whether the new share value after being decremented is equivalent to zero. If the new share value is not equivalent to zero, method 700 proceeds to step 706, which includes storing the new share value in memory (thereby replacing the old share value associated with the encryption key and key identifier in memory). If it is determined in step 704 that the new share value is equivalent to zero, then method 700 proceeds to step 708, which includes deleting the key and the share value associated with the initial share request (sent from the original share requestor, i.e., sender of the private message) from memory. Steps 702, 704, 706, and 708 may be performed by, for example, encryption key manager 330 of FIG. 3, as described above.

A person skilled in the relevant art given this description would appreciate that another method may be used by the trusted third party service to track the number of times the encryption key has been distributed in place of method 700. For example, a separate counter value also associated with the share request (including the encryption key, key identifier, and share value) may be used, as described above. In an embodiment, the counter value may be initialized to zero upon receiving the share request and incremented by one each time the encryption key is distributed in response to a key access request. In an embodiment, the counter value can be compared to the stored share value and an appropriate response may be sent based on the comparison. For example, the encryption key may be distributed to the key access requestor only when the counter value is less than the share value. Alternatively, if the counter value is equivalent to the stored share value associated with a key identifier and encryption key, the stored encryption key and any associated information, including the share value, the key identifier, and counter value may be deleted from memory. The advantage of using the alternative method may be that the original share value remains unchanged, as only the counter value is changed after each time the encryption key is distributed.

V. Example Computer System Implementation

Embodiments shown in FIGS. 1-7, or any part(s) or function(s) thereof, may be implemented using hardware, software modules, firmware, tangible computer readable media having instructions stored thereon, or a combination thereof and may be implemented in one or more computer systems or other processing systems.

Figure 8:
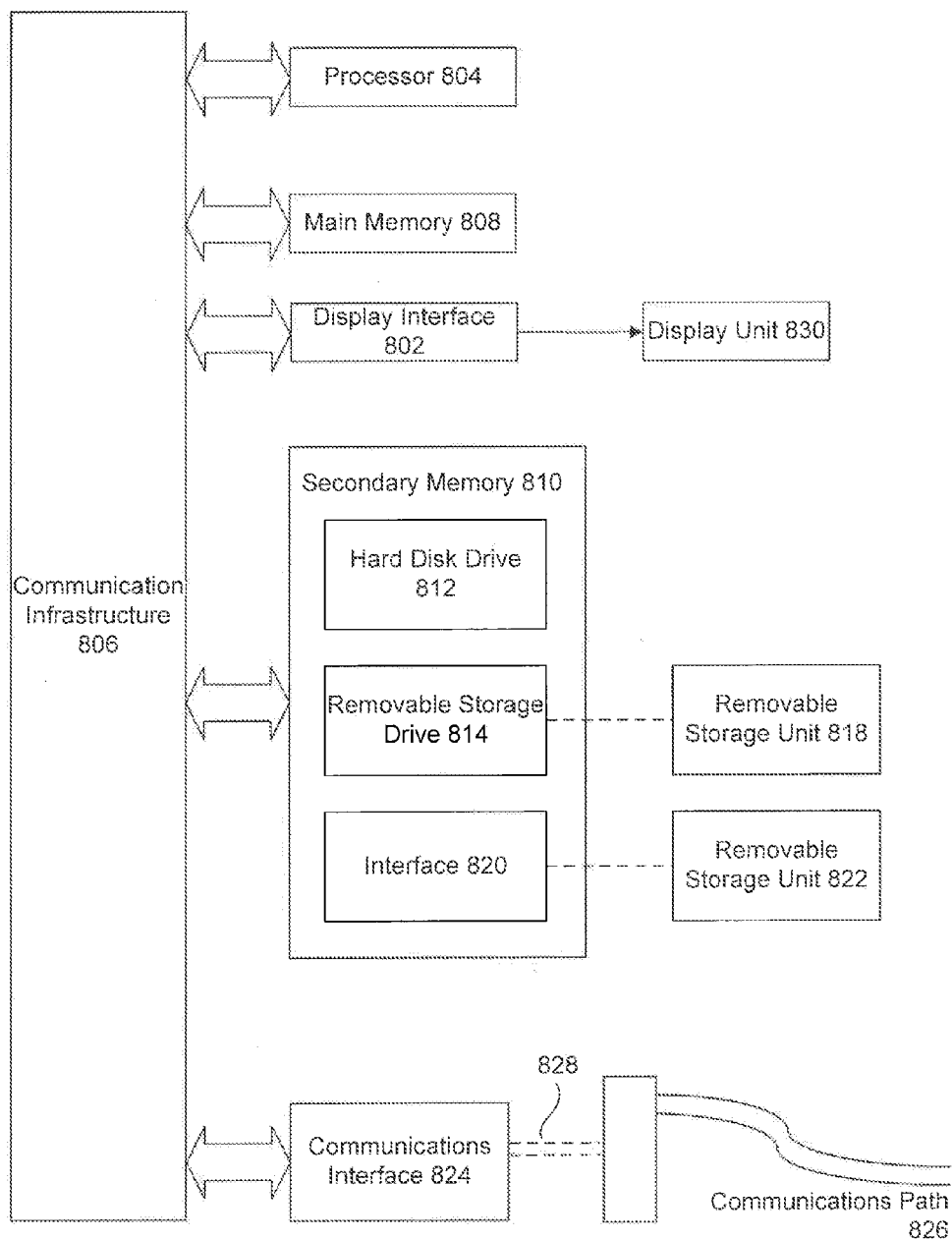
FIG. 8 is a diagram of an example computer system in which embodiments can be implemented.

FIG. 8 illustrates an example computer system 800 in which embodiments, or portions thereof, may be implemented as computer-readable code. For example, computing device 110 in FIGS. 1 and 2 can be implemented in computer system 800 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-7.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 800. After reading this description, it will become apparent to a person skilled in the relevant art how to implement embodiments of the present invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 804 may be a special purpose or a general purpose processor device. As will be appreciated by persons skilled in the relevant art, processor device 804 may also be a single processor in a multi-core/multiprocessor system, such system operating alone, or in a cluster of computing devices operating in a cluster or server farm. Processor device 804 is connected to a communication infrastructure 806, for example, a bus, message queue, network, or multi-core message-passing scheme.

Computer system 800 also includes a main memory 808, for example, random access memory (RAM), and may also include a secondary memory 810. Secondary memory 810 may include, for example, a hard disk drive 812, removable storage drive 814. Removable storage drive 814 may comprise a floppy disk drive, a magnetic tape drive, an optical disk drive, a flash memory, or the like. The removable storage drive 814 reads from and/or writes to a removable storage unit 818 in a well known manner. Removable storage unit 818 may comprise a floppy disk, magnetic tape, optical disk, etc. which is read by and written to by removable storage drive 814. As will be appreciated by persons skilled in the relevant art, removable storage unit 818 includes a computer usable storage medium having stored therein computer software and/or data.

In alternative implementations, secondary memory 810 may include other similar means for allowing computer programs or other instructions to be loaded into computer system 800. Such means may include, for example, a removable storage unit 822 and an interface 820. Examples of such means may include a program cartridge and cartridge interface (such as that found in video game devices), a removable memory chip (such as an EPROM, or PROM) and associated socket, and other removable storage units 822 and interfaces 820 which allow software and data to be transferred from the removable storage unit 822 to computer system 800.

Computer system 800 may also include a communications interface 824. Communications interface 824 allows software and data to be transferred between computer system 800 and external devices. Communications interface 824 may include a modem, a network interface (such as an Ethernet card), a communications port, a PCMCIA slot and card, or the like. Software and data transferred via communications interface 824 may be in the form of signals, which may be electronic, electromagnetic, optical, or other signals capable of being received by communications interface 824. These signals may be provided to communications interface 824 via a communications path 826. Communications path 826 carries signals and may be implemented using wire or cable, fiber optics, a phone line, a cellular phone link, an RF link or other communications channels.

In this document, the terms "computer program medium" and "computer usable medium" are used to generally refer to storage media such as removable storage unit 818, removable storage unit 822, and a hard disk installed in hard disk drive 812. Computer program medium and computer usable medium may also refer to memories, such as main memory 808 and secondary memory 810, which may be memory semiconductors (e.g. DRAMs, etc.).

Computer programs (also called computer control logic) are stored in main memory 808 and/or secondary memory 810. Computer programs may also be received via communications interface 824. Such computer programs, when executed, enable computer system 800 to implement embodiments as discussed herein. In particular, the computer programs, when executed, enable processor device 804 to implement the processes of embodiments of the present invention, such as the stages in the methods illustrated by flowcharts 400, 500, 600, and 700 of FIGS. 4, 5, 6, and 7, respectively, discussed above. Accordingly, such computer programs represent controllers of the computer system 800. Where embodiments are implemented using software, the software may be stored in a computer program product and loaded into computer system 800 using removable storage drive 814, interface 820, and hard disk drive 812, or communications interface 824.

Embodiments of the invention also may be directed to computer program products comprising software stored on any computer useable medium. Such software, when executed in one or more data processing devices, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

VI. Variations

As would be understood by a person skilled in the art based on the teachings herein, several variations of the above described features of sending private messages in an unsecured communication network can be envisioned. These variations are within the scope of embodiments of the present invention. For example, one skilled in the art can envision several variations to the generation and distribution of encryption keys as described in methods 400, 500, 600, and 700 of FIGS. 4, 5, 6, and 7, respectively (e.g., using share request manager 310, key generator 320, encryption key manager 330, and key distribution manager 340 of key distribution service 135, shown in FIG. 3 and described above). For the purpose of illustration only and not limitation, one variation is provided herein.

For example, a variation may include using multiple key distribution service providers to distribute the encryption key as specified by the sender of a private message or communication. Each service provider may be a separate and distinct trusted third party. As described above, the sender of the private message (e.g., client 110A, particularly client application 115 of client 110A, shown in FIG. 1 and described above with respect to FIG. 2) also sends the original request to share the encryption key to one or more recipients of the private message.

In an example, three different encryption keys (e.g., keys K1, K2 and K3) may be generated (e.g., either by key generator 220 of client application 115 of FIG. 2 or by a key generator 320 of key distribution service 135, as described above). The sender can use a first trusted third party key distribution service to distribute K1, a second trusted third party key distribution service to distribute K2, and a third trusted third party key distribution service to distribute K3. As will be described further below, the multiple service providers can be combined to essentially form a single trusted third party. The sender (or one of the trusted third party services) may then encrypt the private message using an encryption key K derived by combining the three encryption keys. For example, the single encryption key K may be derived using the following formula: K=K1⊕K2⊕K3.

The intended recipients of the message can request each encryption key (K1, K2 and K3) from the appropriate trusted third party (as occurs in step 602 of method 600 of FIG. 6, described above). Once the recipient(s) receive all three encryption keys, each recipient can construct the encryption key K by computing the XOR of the three keys, as in the above-noted formula. Thus, as long as at least one of the trusted third parties follows the key distribution protocol (e.g., as described in methods 400, 500, 600 and 700 of FIGS. 4, 5, 6, and 7, respectively), then at least one key among K1, K2 and K3 is safely distributed to the intended recipients without being leaked. In this regard, an attacker would not be able to construct K even if the attacker obtained the other two keys. This significantly minimizes the risk of unauthorized access. To minimize the risk even further while increasing the trustworthiness of the combined third party, additional service providers may be used to distribute different encryption keys as necessary.

It is noted that the formula described above, including the use of the XOR operation, to combine the different encryption keys is provided for illustrative purposes only and embodiments are not limited thereto. It would be apparent to a person skilled in the relevant art given this description that other well-known methods may be used to combine different encryption keys in order to generate the single key.

VII. Conclusion

The Summary and Abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for sending private messages in an unsecured communication network, comprising:
   (a) transmitting an electronic share request for a private message associated with one or more recipients to a trusted third-party, the share request including an encryption key and a share value, wherein the share value is based on a number of the one or more recipients, and the encryption key is distributed by the trusted third-party according to the share value;
   (b) receiving, electronically from the trusted third-party, a key identifier based on the transmitted share request, wherein a new key identifier is generated by the trusted third-party for each of a plurality of share requests;
   (c) sending the received key identifier electronically to the one or more recipients, wherein the key identifier is used by the one or more recipients to request the encryption key from the trusted third-party, and the encryption key is used by the one or more recipients to decrypt the encrypted private message;
   (d) verifying that a receipt notification is received from each recipient in the one or more recipients, wherein the receipt notification is sent by each recipient in response to obtaining the encryption key from the trusted third-party; and
   (e) sending the encrypted private message to the one or more recipients based on the verifying in step (d), wherein the encrypted message is sent only after the receipt notification is received from each recipient in the one or more recipients.

2. The method of claim 1, further comprising:
   repeating steps (a)-(d) for a new encryption key based on the verifying in step (d), wherein the encryption key is discarded when the receipt notification is not received from each recipient.

3. The method of claim 1, wherein steps (c)-(g) are performed automatically, without user intervention, in response to the receiving in step (b).

4. A computer-implemented method for distributing an encryption key in an unsecured communication network, comprising:
   (a) receiving, by at least one computing device, a share request from a sender, the share request comprising the encryption key and a share value based on a number of one or more recipients, wherein the share value is used to determine a number of times the encryption key may be distributed to the one or more recipients;
   (b) generating a key identifier in response to the received share request, wherein a new key identifier is generated by the at least one computing device for each new encryption key included in each of a plurality of share requests;
   (c) transmitting the generated key identifier to the sender;
   (d) storing, in a memory of the at least one computing device, the received share value, the received encryption key, and the generated key identifier;
   (e) receiving, by the at least one computing device, a key access request from the one or more recipients, the key access request comprising the key identifier, wherein the key identifier is used by the one or more recipients to request the encryption key from the at least one computing device; and (f) distributing, by the at least one computing device, the stored encryption key to the one or more recipients based on the received retrieval request and the stored share value, wherein the encryption key is used by the one or more recipients to decrypt an encrypted private message.

5. The method of claim 4, further comprising:

(g) deleting, from the memory of the at least one computing device, the stored share value, encryption key, and key identifier after a predetermined duration of time.

6. The method of claim 4, wherein the generating the key identifier in step (b) comprises generating a random number value to produce the key identifier.

7. The method of claim 4, wherein the storing (d) comprises:

(i) initializing a counter value to zero;
(ii) associating the received share value, the received encryption key, the generated key identifier, and the initialized counter value; and
(iii) storing, in the memory of the at least one computing device, the associated share value, encryption key, key identifier, and counter value.

8. The method of claim 7, wherein the distributing (f) comprises:

(i) comparing the stored share value with the associated counter value;
(ii) sending a response to the one or more recipients based on the comparing (i); and
(iii) incrementing the counter value by a value of one based on the comparing (i),
wherein the response includes the encryption key only when the counter value is less than the share value,
wherein the response includes an error message when the counter value is equivalent to the share value, and
wherein the incrementing (iii) is performed only when the counter value is less than the share value.

9. The method of claim 8, further comprising:

(iv) deleting, from the memory of the at least one computing device, the associated share value, encryption key, key identifier, and counter value when the counter value is equivalent to the share value.

10. The method of claim 4, wherein the receiving (a) comprises receiving, by the at least one computing device, the share request from the sender via a secure communication channel, the share request comprising the encryption key and the share value based on the number of one or more recipients, wherein the share value is used to determine the number of times the encryption key may be distributed to the one or more recipients, and wherein the transmitting (c) comprises transmitting the generated key identifier to the sender via the secure communication channel.

11. The method of claim 10, wherein the communication channel uses Hypertext Transfer Protocol Secure (HTTPS).

12. A system for sending private messages in an unsecured communication network, comprising:

a message interface to enable a user to select an option to electronically send a private message to one or more recipients, and to receive the selected option to electronically send the private message from the user;
a key generator to generate an encryption key for the private message;
a share request generator to:
encrypt the private message using the generated encryption key and generate a share value for the private message, the share value based on a number of the one or more recipients, wherein the share value is used to determine a number of times an encryption key may be distributed, and
transmit a share request for the private message to a trusted third-party, the share request including the generated encryption key and the generated share value, wherein the trusted, third-party distributes the encryption key according to the share value; and
a verification unit to:
receive, from the trusted third-party, a key identifier based on the transmitted share request, wherein a new key identifier is generated by the trusted third-party for each of a plurality of share requests;
send the received key identifier to the one or more recipients, wherein the key identifier is used by the one or more recipients to request the encryption key from the trusted third-party and the encryption key is used by the one or more recipients to decrypt the encrypted private message;
verify that a receipt notification has been received from each recipient in the one or more recipients, wherein the receipt notification is sent by each recipient in response to obtaining the encryption key from the trusted third-party, the generated encryption key is discarded when the receipt notification is not received from each recipient, and the operations performed by the key generator, the share request generator, and the verification unit are repeated for a new encryption key; and
send the encrypted private message to the one or more recipients based on the verification, wherein the encrypted private message is sent only after the receipt notification is received from each recipient in the one or more recipients.

13. A system for distributing an encryption key associated with a private message sent in an unsecured communication network, comprising:

a share request manager to receive a share request from a sender, the share request from a sender, the share value based on a number of one or more recipients, wherein the share value is used to determine a number of times the encryption key may be distributed;
an encryption key manager to generate a key identifier for the encryption key, to transmit the generated key identifier to the sender, and to store, in a memory, the received share value, the encryption key, and the generated key identifier; and
a key distribution manager to receive a key access request from the one or more recipients, the key access request comprising the key identifier, wherein the key identifier is used by the one or more recipients to request the encryption key, and to distribute the stored encryption key to the one or more recipients based on the received key access request and the stored share value, wherein the encryption key is used by the one or more recipients to decrypt an encrypted version of the private message.

14. The system of claim 13, wherein the encryption key manager is further configured to delete, from the memory, the stored share value, encryption key, and key identifier after a predetermined duration of time.

15. The system of claim 13, further comprising:

a key generator to generate the encryption key in response to the received share request, wherein a new encryption key is generated for each of a plurality of share requests.

16. The system of claim 15, wherein the key generator is configured to generate the key identifier by generating a random number value.

17. The system of claim 13, wherein the encryption key manager is further configured to initialize a counter value to zero, to associate the received share value, the generated encryption key, the generated key identifier, and the initialized counter value, and to store, in the memory, the associated share value, encryption key, key identifier, and counter value.

18. The system of claim 17, wherein the key distribution manager is configured to compare the stored share value with the associated counter value, to send a response to the one or more recipients based on the comparison, and to increment the counter value by a value of one based on the comparison, wherein the response comprises the encryption key when the counter value is less than the share value, wherein the response comprises an error message when the counter value is equivalent to the share value, and wherein the counter value is incremented only when the counter value is less than the share value.

19. The system of claim 18 wherein the encryption key manager is further configured to delete, from the memory, the associated share value, encryption key, key identifier, and counter value when the counter value is equivalent to the share value.

20. The system of claim 13, wherein the share request manager is configured to receive the share request from the sender via a secure communication channel, the share request comprising the share value based on the number of one or more recipients, wherein the share value is used to determine the number of times the encryption key may be distributed, and wherein the encryption key manager is configured to transmit the generated encryption key and the generated key identifier to the sender via the secure communication channel, and to store, in the memory, the received share value, the generated encryption key, and the generated key identifier.

21. The system of claim 20, wherein the communication channel uses Hypertext Transfer Protocol Secure (HTTPS).

22. A system for sending private messages
a message interface to enable a user to select an option to electronically send a private message to one or more recipients, and to receive the selected option to electronically send the private message from the user;
a share request generator to:
to generate a share value for the private message, the share value based on a number of the one or more recipients, wherein the share value is used to determine a number of times an encryption key may be distributed, and
transmit a share request for the private message to a trusted third-party, the share request including the encryption key and the generated share value, wherein the trusted third-party distributes the encryption key according to the share value; and
a verification unit to:
receive, from the trusted third-party, a key identifier based on the transmitted share request and an encrypted version of the private message, wherein a new key identifier is generated by the trusted third-party for each of a plurality of share requests;
send the received key identifier to the one or more recipients, wherein the key identifier is used by the one or more recipients to request the encryption key from the trusted third-party and the encryption key is used by the one or more recipients to decrypt the encrypted version of the private message;
verify that a receipt notification has been received from each recipient in the one or more recipients, wherein the receipt notification is sent by each recipient in response to obtaining the encryption key from the trusted third-party, the encryption key is discarded when the receipt notification is not received from each recipient, and the operations performed by the key generator, the share request generator, and the verification unit are repeated for a new encryption key; and
send the encrypted version of the private message to the one or more recipients based on the verification, wherein the encrypted version of the private message is sent only after the receipt notification is received from each recipient in the one or more recipients.

* * * * *